UNITED STATES PATENT OFFICE.

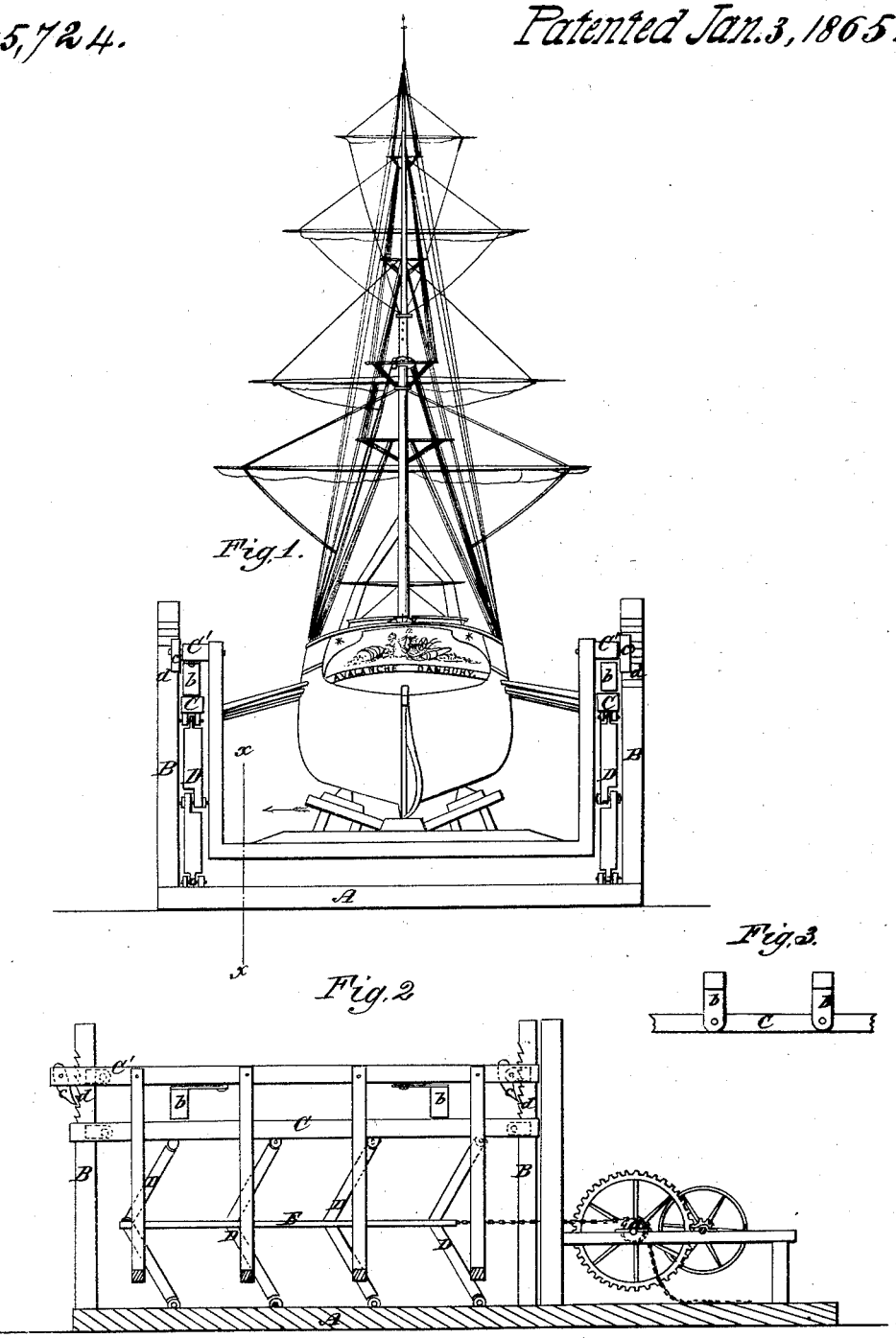

Z. P. LEACH, OF DANBURY, CONNECTICUT.

IMPROVEMENT IN LIFTING-DOCKS.

Specification forming part of Letters Patent No. 45,724, dated January 3, 1865.

*To all whom it may concern:*

Be it known that I, Z. P. LEACH, of Danbury, in the county of Fairfield and State of Connecticut, have invented a new and Improved Lifting-Dock; and I do hereby declare that the following is a full, clear, and exact description thereof, which will enable others skilled in the art to make and use the same, reference being had to the accompanying drawings, forming part of this specification, in which—

Figure 1 is an end view of this invention. Fig. 2 is a longitudinal vertical section of the same, taken in the plane indicated by the line $x\,x$, Fig. 1, and looking in the direction of the arrow marked opposite to that line. Fig. 3 is an inverted plan of one of the supplementary beams.

Similar letters of reference indicate like parts.

This invention consists in the employment or use of a series of toggle-levers, connected to each other and to a rising and falling beam, which supports the cradle in such a manner that by exerting a strain on the strap, rod, or chain connecting the toggle-levers a powerful upward strain is produced on the beams supporting the cradle, and a vessel placed on the cradle can be lifted up and sustained above the surface of the water with ease and facility.

The invention consists, further, in the application of supplementary beams provided with legs which can be turned in or out, and with dogs to catch in suitable teeth in such a manner that, when the cradle is attached to these supplementary beams and raised to a certain height, said supplementary beams, together with all the weight suspended therefrom, can be sustained by the dogs, and the main beams can be lowered to allow of turning in the legs and take a fresh hold in such cases where the lifting capacity of the toggle-levers is not sufficient to raise the vessel high enough out of the water.

A represents a platform or bed which supports the entire structure of my lifting-dock. From this platform rise a series of uprights, B, which are placed at suitable distances apart and form the guides for the horizontal beams C. These beams are raised and lowered by a series of toggle-levers, D, which are pivoted at suitable distances apart to the platform A and to said beams, as clearly shown in Fig. 2.

The fulcra of all these toggle-levers are connected by a strap, E, or by a chain or other suitable means, and from said strap extends a chain round a drum, $a$, to which a rotary motion is imparted by a steam-engine or other source of power.

The motion of the drum $a$ is slow and powerful, and by exerting a strain on the strap E in the direction of the arrow marked on it in Fig. 2, the toggle-levers are straightened and the beams C are raised.

The drums on both sides of the dock are revolved simultaneously, so that the beams on both sides rise and fall with uniform speed, and in practice both drums will be driven from one and the same engine or other source of power, and with precisely the same speed.

The cradle which supports the vessel to be lifted may be suspended from the beams C, or supplementary beams C' may be applied, which are guided by the uprights B the same as the main beams C.

Hinged to the under surfaces of the supplementary beams are legs $b$, which, when turned out to the position shown in Fig. 3, allow the supplementary beams to come down close upon the main beams C; but if said legs are turned in to the position shown in Fig. 2, the supplementary beams are elevated some distance above the main beams, as shown in Figs. 1 and 2.

In order to retain the supplementary beams above the main beams and free from the same, they are provided with dogs $c$, which can be made to engage with ratchet teeth $d$, cut in the edges of the uprights B.

If the cradle is suspended from the supplementary beams and a vessel is to be raised out of the water in the dock, the legs $b$ are first turned out and the supplementary beams brought down close upon the main beams, which are supposed to occupy their lowest position, and the vessel is floated into the dock. By exerting a strain on the strap E the toggle-levers are straightened and the cradle, together with the vessel, are raised.

The height to which the vessel can be raised depends, of course, upon the stroke of the toggle-levers, and if it is desirable to raise the vessel still higher, I fasten the supplemtary beams by means of the dogs $c$, and then the main beams are lowered, the legs $b$ are turned in, and, by exerting a fresh strain on the toggle-levers, the vessel is raised for a distance equal to the height of said legs. It is obvious this distance can still further be increased by repeating the operation and using blocks of wood under the legs. By these means the lifting capacity of the dock can be increased to any desired extent and the dock can be used for vessels of different depth and size.

I claim as new and desire to secure by Letters Patent—

1. The toggle-levers D, connected to each other by straps E, or their equivalents, and operating in combination with the rising and falling beams C, substantially as and for the purpose herein set forth.

2. The supplementary beams C', provided with legs $b$ and applied in combination with the main beams C and toggle-levers D, in the manner and for the purpose substantially as described.

Z. P. LEACH.

Witnesses:
EDGAR WYGANT,
LYMAN D. BREWSTER.